US007064708B2

(12) United States Patent
Akopian et al.

(10) Patent No.: US 7,064,708 B2
(45) Date of Patent: Jun. 20, 2006

(54) VALIDATION OF BEACON SIGNALS

(75) Inventors: David Akopian, Tampere (FI); Harri Valio, Kammenniemi (FI); Samuli Pietila, Tampere (FI); Jari Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 248 days.

(21) Appl. No.: 10/693,332

(22) Filed: Oct. 24, 2003

(65) Prior Publication Data

US 2004/0165689 A1 Aug. 26, 2004

(30) Foreign Application Priority Data

Oct. 24, 2002 (WO) ........................ PCT/IB02/04424

(51) Int. Cl.
*G01S 5/02* (2006.01)
*H04B 7/185* (2006.01)

(52) U.S. Cl. ................................. 342/357.12

(58) Field of Classification Search ........... 342/357.06, 342/357.12, 357.15; 701/213, 215
See application file for complete search history.

(56) References Cited

U.S. PATENT DOCUMENTS

| | | | |
|---|---|---|---|
| 5,960,341 A | | 9/1999 | LeBlanc et al. |
| 6,049,303 A | | 4/2000 | Biacs et al. |
| 6,243,648 B1 | | 6/2001 | Kilfeather et al. |
| 6,646,596 B1 | * | 11/2003 | Syrjarinne et al. ..... 342/357.15 |
| 6,967,992 B1 | * | 11/2005 | Rabaeijs et al. ............ 375/150 |
| 2001/0050926 A1 | * | 12/2001 | Kumar ........................ 370/529 |

FOREIGN PATENT DOCUMENTS

| | | |
|---|---|---|
| EP | 0 869 373 | 10/1998 |
| EP | 1 143 674 | 10/2001 |

OTHER PUBLICATIONS

R. D. Fontana, W. Cheung and T. Stansell, "*The Modernized L2 Civil Signal—Leaping Forward in the 21$^{st}$ Century*," GPS World, Sep. 2001, pp. 28-34.
E. D. Kaplan, "*Understanding GPS: Principles and Applications*," copyright 1996 Artech House, Inc., pp. 306-320.
P. H. Dana, "*Global Positioning System Overview*," rev. May 1, 2000 (first published Sep., 1994), web site http://www.colorado.edu/geography/gcraft/notes/gps/gps_f.html.

* cited by examiner

*Primary Examiner*—Dao Phan
(74) *Attorney, Agent, or Firm*—Alfred A. Fresssola; Ware, Fressola, Van Der Sluys & Adolphson LLP

(57) ABSTRACT

A method for validating detected code modulated signals transmitted by beacons of a positioning system and received by a receiver comprises as a first step performing measurements for the detected beacon signals. Then, at least one of the detected beacon signals is selected as a calibration signal. In a next step, at least one allowed range for results of measurements for detected beacon signals other than the calibration signal are determined based on measurements for the detected calibration signal and on an available reference position of the receiver. Finally, each detection of a beacon signal for which results of performed measurements are outside of an allowed range is rejected. The invention relates equally to a corresponding receiver, to an electronic device comprising such a receiver, to a device cooperating with such a receiver and to a corresponding positioning system.

18 Claims, 3 Drawing Sheets

VALIDATION OF BEACON SIGNALS

CROSS REFERENCE TO RELATED APPLICATIONS

This application claims priority under 35 USC §119 to International Patent Application No. PCT/IB02/04424 filed on Oct. 24, 2002.

FIELD OF THE INVENTION

The invention relates to a method for validating detected code modulated signals transmitted by beacons of a positioning system and received by a receiver of the positioning system. The beacon signals are detected based on a correlation procedure performed between a respective given code for a specific beacon and received beacon signals. The invention relates equally to a corresponding receiver, to an electronic device comprising such a receiver, to a device cooperating with such a receiver and to a corresponding positioning system.

BACKGROUND OF THE INVENTION

A well known positioning system which is based on the evaluation of signals transmitted by beacons is GPS (Global Positioning System). The constellation in GPS consists of more than 20 satellites employed as beacons that orbit the earth. The distribution of these satellites ensure that usually between five and eight satellites are visible from any point on the earth.

Each of the satellites, which are also called space vehicles (SV), transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with navigation information at a bit rate of 50 bit/s. The 50 Hz data bit stream of the navigation message is aligned with the C/A code transitions. The navigation information comprises in particular orbit parameters like ephemeris data. Ephemeris parameters describe short sections of the orbit of the respective satellite. Based on these ephemeris parameters, an algorithm can estimate the position and the velocity of the satellite for any time of about 2–4 hours during which the satellite is in the respective described section. Ephemeris data also comprise clock correction parameters which indicate the current deviation of the satellite clock versus a general GPS time. Further, a time-of-week TOW count is reported every six seconds as another part of the navigation message.

A GPS receiver of which the position is to be determined receives the signals transmitted by the currently available satellites, and a tracking unit of the receiver detects and tracks the channels used by different satellites based on the different comprised C/A codes.

In order to be able to detect the channels used by different satellites, the receiver has access to a replica of the C/A codes employed by each of the satellites. The receiver is thus able to compare the available C/A codes with the C/A codes in the received signals in a correlation procedure.

By evaluating measurements on the tracked signals, the receiver first determines the time of transmission of the ranging code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits. A detected epoch edge also indicates the code phase of a received signal.

Based on the time of transmission and the measured time of arrival TOA of the ranging code at the receiver, the time of flight TOF required by the ranging code to propagate from the satellite to the receiver is determined. By multiplying this TOF with the speed of light, it is converted to the distance between the receiver and the respective satellite. The computed distance between a specific satellite and a receiver is called pseudo-range, because the general GPS time is not accurately known in the receiver. Usually, the receiver calculates the accurate time of arrival of a ranging code based on some initial estimate, and the more accurate the initial time estimate is, the more efficient are position and accurate time calculations. A reference GPS time can, but does not have to be provided to the receiver by a communications network.

The computed distances and the estimated positions of the satellites then permit a calculation of the current position of the receiver, since the receiver is located at an intersection of the pseudo-ranges from a set of satellites. In order to be able to compute a position of a receiver in three dimensions and the time offset in the receiver clock, the signals from at least four different GPS satellites are required.

If navigation data are available on one of the receiver channels, the indication of the time of transmission comprised in a received signal can also be used in a time initialization for correcting a clock error in the receiver as the internal receiver clock is generally biased.

Currently, most GPS receivers are designed for outdoor operations with good signal levels from satellites.

In case of bad reception conditions, e.g. indoors, the tracking of signals is less reliable with such receivers. One of the problems is the cross-correlation effect between the satellites. When searching for a specific satellite signal, often an undesired cross-correlated signal from another satellite will be found. The signal-to-noise ratios of signals from different satellites vary within a wide range indoors, as the satellite signals undergo different attenuation. This implies that the signal from one satellite may be quite strong, while the signal from another satellite is rather weak. At the same time, the pseudonoise properties of the satellite signals provide only a limited selectivity during the correlation process. Signals from wrong satellites and code-phases are only attenuated by around 20 dB in the correlation procedure. Thus, if the differences in the signal-to-noise ratio of the different satellite signals are higher than this attenuation, then the signal from wrong satellites could interfere with a given channel. That is, a wrong satellite signal with a high signal level can be determined in the correlation procedure to be the desired satellite signal, in case the correct satellite signal has a low signal level. This makes normal tracking impossible.

In a known approach aimed at avoiding a wrong tracking, only those satellites are considered which have a limited difference in their signal-to-noise ratios. This approach has the disadvantage, however, that the receiver will often not be able to calculate the position when only signals from a few satellites are received, which is the most probable scenario indoors.

A known system called RAIM (Receiver Autonomous Integrity Monitoring), which is employed in airplanes, studies whether the measurements on tracked satellites are correct. However, RAIM is designed for use in good signal conditions and also requires reception of signals from at least 5 satellites.

SUMMARY OF THE INVENTION

It is an object of the invention to enable a reliable detection of a sufficient number of beacon signals also under weak signaling conditions.

This object is reached with a method for validating detected code modulated signals transmitted by beacons of a positioning system and received by a receiver of said positioning system, which beacon signals are detected based on a correlation procedure performed between a respective given code for a specific beacon and received beacon signals. The proposed method comprises in a first step performing measurements for the detected beacon signals. At least one of the detected beacon signals is then selected as calibration signal. Based on measurements for the detected calibration signal and on an available reference position of the receiver, at least one allowed range for the results of measurements for the other detected beacon signals is determined. Each detection of a beacon signal for which results of performed measurements are outside of a range determined for these measurements is rejected. It is to be noted that the range determined for a specific kind of measurement may also be composed of several sub-ranges. Further, a determined allowed range may comprise only a single value. It is understood that the order of the proposed steps can partly be varied.

The object is further reached with a receiver, with an electronic device comprising a receiver or with some other device, either comprising means for carrying out the steps of the proposed method. In case the processing is performed in a unit other than the receiver, the required information about the received signals is forwarded by the receiver to this unit. The proposed other device can be for instance a network element of a network. The object is also reached with a system comprising a receiver and a device, in which system either the receiver or the device comprises means for carrying out the steps of the proposed method. In case the receiver performs the processing, the device may provide assistance data to the receiver required for the verification of the detected beacon signals.

The invention proceeds from the idea that the signal of a beacon which can be assumed to be detected correctly can be used for validating the detection of other beacon signals, i.e. for studying after the correlation procedure whether an already acquired beacon is recognized as correct beacon. Even in bad signaling conditions, one such beacon which can be assumed to be detected correctly will usually be found without problems. Measurements on the signals from this beacon signal can be used for bounding one or more measurements from the other beacons. If measurement results are outside of the specified range, then the respective beacon signal is supposed to be detected wrongly. It is understood that the measurements may comprise direct measurements, including the extraction of data from received signals, and a calculation of parameters based on such measurements.

It is an advantage of the invention that it allows to detect a large percentage of received beacon signals and to determine among the detected beacon signals a large percentage of wrongly detected signals.

The invention thereby allows to calculate the position of the receiver in bad propagation conditions and when only signals from a few satellites are available which have a high difference in the signal-to-noise ratio. Thus, the probability that a positioning can be performed is increased and the determined position is also more accurate due to the rejection of wrongly detected signals. Furthermore, other errors which affect the accuracy of the positioning can be reduced.

It is moreover an advantage of the invention that it is easy to implement.

Preferred embodiments of the invention become apparent from the dependent claims.

For the reference position of the receiver, a rather coarse knowledge of the receiver position is sufficient. Such a coarse knowledge might be available for example, in case the position was calculated recently. Alternatively, the receiver could be an assisted receiver, which receives an indication of the reference position from another unit. For example, the position of a base station of a mobile communication network to which the receiver is currently connected might be used as reference position. In case the processing is carried out in a unit external to the receiver, the reference position is either available at this unit or supplied to this unit.

Also other available assistance data can be used for determining the range for some measurements. Such other assistance data may be in particular orbit parameters.

Various kinds of measurements are suited for determining whether they lie in a determined range.

Preferably, the method according to the invention is employed at least for verifying whether a determined time of transmission of the detected signals or a sub component of this time of transmission lies within an acceptable range. That is, the code phase of the detected signals is checked.

Another measurement which is suited for the verification relates to the frequency shift in the detected signals at the receiver due to the Doppler effect. For the verification, it can be determined whether the entire frequency or a determined frequency shift lies in an acceptable range.

In case ephemeris and time information is available, and in addition the reference position is known with an accuracy of 3 km, then 90% of wrongly cross-correlated satellites can be recognized by verifying the code phase of a detected signal. If the Doppler frequency is verified in addition to the code phase, even more than 90% of wrongly cross-correlated satellites can be recognized. In case the reference position is known with an accuracy of 30 km, still more than 50% of wrongly cross-correlated satellites can be recognized by verifying the code phase and the Doppler frequency.

The code modulated beacon signals may be detected in a tracking process, but equally in any other type of process, e.g. in a snapshot data processing. Further, the measurement results employed in the method according to the invention may originate from a tracking process or from some other process.

Preferably, though not necessarily, the method according to the invention is implemented as software.

The beacons can be in particular, though not exclusively, satellites or a base stations of a network.

Preferably, though not necessarily, the receiver is a GPS receiver and the beacons are GPS space vehicles. The invention can be employed as well for instance in future extended GPS systems with new signals, in particular the planned new L2C (L2 civil) signal and the planned new L5 signal, and in other similar beacon based positioning systems such as Galileo. The L2C signal and the L5 signal are presented for example in the document "The Modernized L2 Civil Signal" in GPS World, September 2001, by Richard D. Fonata, Way Cheung, and Tom Stansell.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
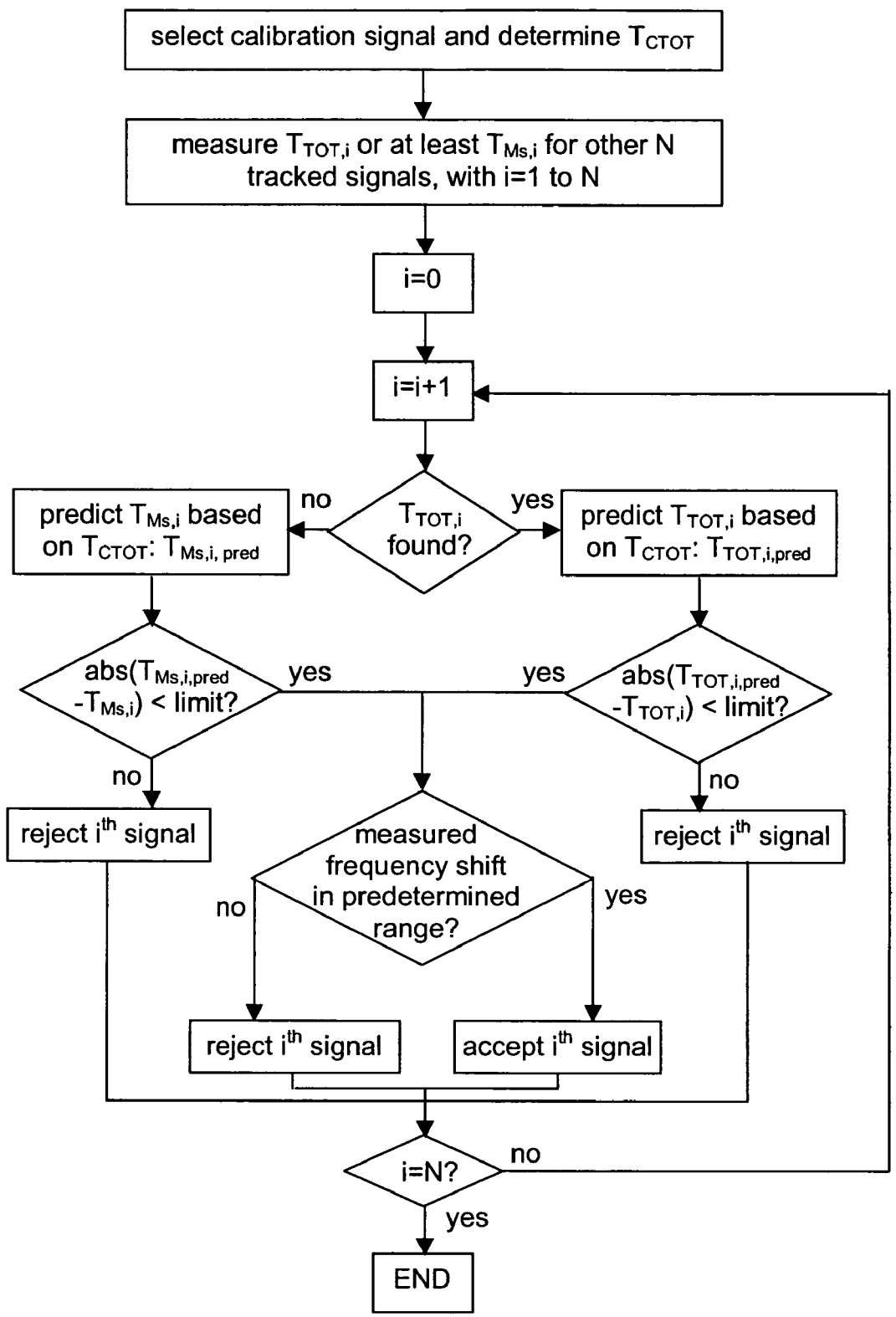
FIG. 1 is a flow-chart which illustrates an embodiment of the method according to the invention.

The flow chart of FIG. 1 illustrates an embodiment of a method for validating a tracking of satellite signals (beacons) according to the invention.

Figure 2:
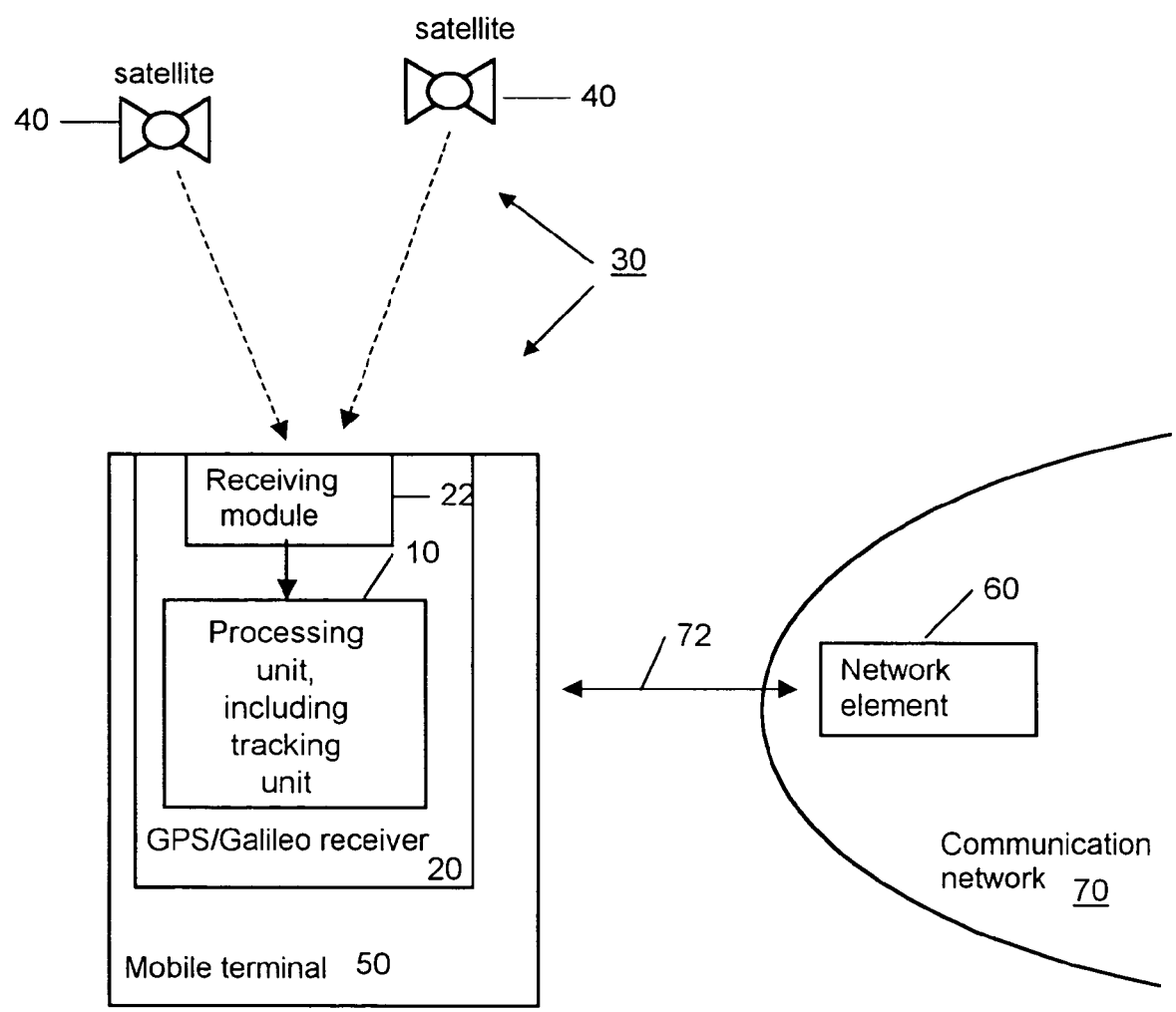
FIG. 2 is a block diagram of a positioning system according to the present invention and also shows a receiver and a mobile terminal (electronic device) according to the present invention.

As seen in FIG. 2, the method is implemented as a software algorithm in a processing unit 10 of a GPS receiver 20 of a GPS positioning system 30. Several satellites SV 40 of the GPS system transmit C/A code modulated signals as described above. The signals transmitted by the satellites are received by a receiving module 22 of the GPS receiver 20 and tracked by a tracking unit within processing unit 10 of the receiver. The GPS receiver is moreover integrated in a mobile terminal 50 which is able to communicate via the air interface with a base station 60 (shown as a network element) of a communication network 70. Currently, the GPS receiver is located indoors.

Figure 3:
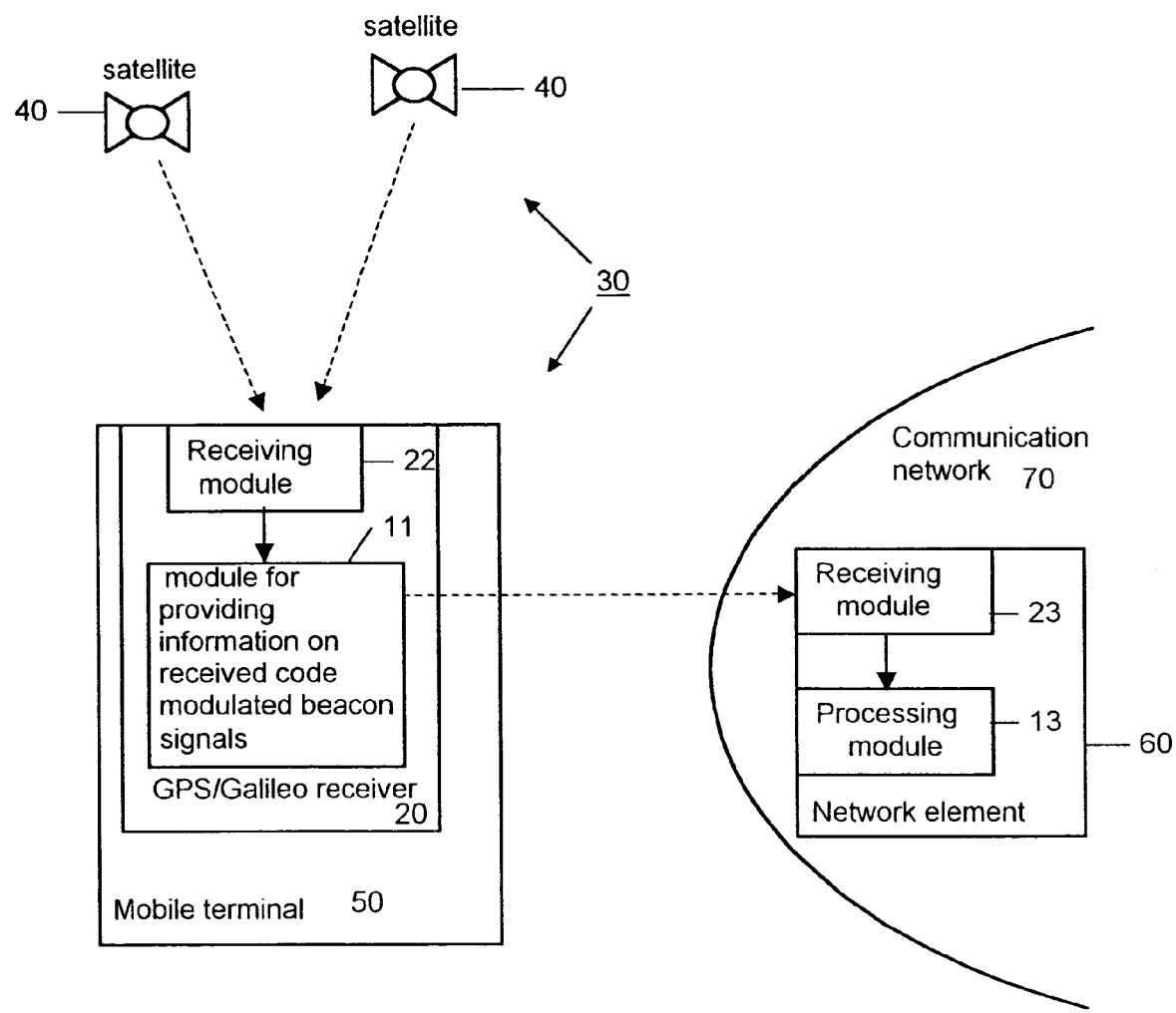
FIG. 3 is a block diagram of another positioning system according to the present invention and also shows a network element according to the present invention.

As seen in FIG. 3, the receiver 20 may have a module 11 instead of processing unit 10 shown in FIG. 2. This module 11 is for receiving the information from the receiving module 12, and from this information providing information regarding the received code modulated beacon signal from the SVs 40. As seen in FIG. 3, the base station (network element) 60 in this embodiment includes a receiver module 23 and a processing module 13 for performing the remaining functions of the tracking methods of the present invention.

The tracking unit of the GPS receiver may be a conventional tracking unit which is able to detect and track received satellite signals based on a correlation procedure. In the correlation procedure, a code which is available for a respective satellite is compared with received signals. The signal resulting in the best correlation is supposed to originate from the respective satellite.

In addition, the tracking unit is able to provide for each tracked satellite signal a subcomponent $T_{Ms}$ of the time of transmission of the respective ranging code. Each subcomponent $T_{Ms}$ is a sub M seconds component of the time of transmission. In case the tracking unit is able to perform a bit-synchronization on the received signals, the subcomponent is a sub 20 ms (M=0.020) component of the time of transmission, i.e. the difference between the time of transmission of the last detected bit edge and the time of transmission of the ranging code. Otherwise, the measurement is based on a chip count for the received signals, resulting in a sub 1 ms (M=0.001) component. In the latter case, the subcomponent corresponds to the difference between the time of transmission of the last detected epoch edge and the time of transmission of the respective ranging code.

Since the GPS receiver is currently located indoors, it detects and tracks signals from N+1 satellites with significantly different signal-to-noise ratios.

For the proposed method, it is moreover assumed that certain parameters are available at the GPS receiver.

One of these parameters is an initial reference position $P_{init}$ of the GPS receiver. The initial reference position may be for example the position of a base station to which the mobile terminal comprising the GPS receiver is currently connected. In this case, the initial reference position $P_{init}$ could be communicated to the GPS receiver by this base station. The initial reference position has an equally known maximal possible error $dP_{max}$.

Further, as seen in the embodiment of FIG. 2, it is assumed that the base station 60 of the mobile communication network 70 provides the GPS receiver with assistance messages comprising orbit parameters for the satellites by which the tracked signals are supposed to be transmitted. This is shown by the left arrow of double-arrowed line 72.

Finally, an initial estimate of the time of flights $T_{TOF}$ of the signals from the satellites to the GPS receiver is set to $T_{TOF}=0.070$ ms The proposed method functions as follows.

In a first step, the tracked satellite signal with the strongest signal level is determined in a processing unit of the receiver. This satellite signal is defined as a calibration signal. The processing unit moreover decodes the navigation message extracted from the calibration signal in order to obtain the included time-of-week TOW count. The TOW count indicates the main component of the time of transmission $T_{CTOT}$ of the ranging code. An epoch and chip count performed by the tracking unit of the GPS receiver provide in addition the millisecond and submillisecond component of the time of transmission $T_{CTOT}$. Further, the time of flight $T_{CTOF}$ of the calibration signal is estimated. To this end, for example the position of the satellite transmitting the calibration signal at the determined time of transmission $T_{CTOT}$ is calculated from orbit parameters for this satellite. The orbit parameters may be available at the receiver or be extracted as well from the decoded navigation message. The time of flight $T_{CTOF}$ can then be estimated based on the determined satellite position and on the available initial reference position $P_{init}$ of the receiver by dividing the distance between the two positions by the speed of light.

Next, the processing unit of the receiver determines at least a part of the time of transmission of the ranging code of all N other tracked signals. If the navigation message of an $i^{th}$ signal can be decoded, the complete time of transmission $T_{TOT,i}$ for the $i^{th}$ signal is obtained. If the navigation message cannot be decoded, at least a subcomponent $T_{Ms,i}$ of the time of transmission can be determined. That is, if a bit synchronization is achieved, a sub 20 ms component of the time of transmission $T_{20ms}$ is obtained. Otherwise, the chip count by the tracking unit provides a subms component $T_{1ms}$ of the time of transmission. The value of the variable i, i=1 to N, identifies a respective, tracked signal and values associated to this signal.

Now, each of the N other tracked signals is verified by the processing unit of the GPS receiver one after the other in a calibration loop. In the calibration loop, the variable i is first set to 1 and incremented by 1 with each repetition.

The available initial reference position $P_{init}$ and the determined time of transmission $T_{CTOT}$ of the calibration signal are used for estimating the time-of-flight $T_{TOF,i}$ of the $i^{th}$ signal. For example, first the position of the $i^{th}$ satellite at the time of transmission $T_{CTOT}$ of the calibration signal may be estimated based on the orbit parameters available at the receiver for the satellite which is assumed to transmit the $i^{th}$ signal. Then, the time of flight $T_{TOF,i}$ of the $i^{th}$ signal is estimated by dividing the distance between the estimated satellite position and on the available initial position $P_{init}$ by the speed of light. The error in time for which the satellite position is calculated, i.e. the difference between the time of transmission $T_{CTOT}$ of the calibration signal and the time of transmission of the $i^{th}$ signal, is around 40 ms, which has a negligible effect on the time of flight.

Proceeding from the determined time of flight $T_{TOF,i}$, at least a subcomponent of the time of transmission of the $i^{th}$ signal is predicted. For this prediction, the processing unit differentiates between two cases.

In case the time of transmission $T_{TOT,i}$ was found for the $i^{th}$ signal, the time of transmission is predicted to be:

$$T_{TOT,i,pred} = T_{CTOT} + T_{CTOF} - T_{TOF,i} - \text{Corrections}.$$

In case the entire time of transmission $T_{TOT,i}$ was not found for the $i^{th}$ signal, but only a subcomponent $T_{Ms,i}$ of this time of transmission $T_{TOT,i}$, the respective subcomponent is predicted to be:

$$T_{Ms,i,pred} = \text{mod}(T_{CTOT} + T_{CTOF} - T_{TOF,i} - \text{Corrections}, M)$$

The right hand side of the equation constitutes the residual of the division of $T_{CTOT} - T_{CTOF} - T_{TOF,i}$ by M, wherein the term $T_{CTOT} - T_{CTOF} - T_{TOF,i}$ may be corrected with a known correction value "Corrections". As explained above, M can be either 0.020 or 0.001. The value "Corrections" in the equation can, but does not have to be included. It may comprise e.g. ionospheric corrections, tropospheric corrections, group delay corrections, corrections of the satellite clock and relativistic corrections.

From the known error $dP_{max}$ of the initial position $P_{init}$, the maximum error that may occur for the predicted time of transmission $T_{TOTmaxerror}$ is estimated to be $T_{TOTmaxerror} = 2 \cdot dP_{max}/c$, where c is the speed of light.

The actual prediction error is then compared with this maximum prediction error.

In case the time of transmission $T_{TOT,i}$ was found for the $i^{th}$ signal, the actual prediction error is compared with the maximum prediction error $T_{TOTmaxerror}$ according to the following equation:

$$\text{abs}(T_{TOT,i,pred} - T_{TOT,i}) < T_{TOTmaxerror}$$

Thereby, it is determined whether the determined time of transmission $T_{TOT,i}$ of the $i^{th}$ signal lies within the acceptable range:

$$(T_{TOT,i,pred} - T_{TOTmaxerror}, T_{TOT,i,pred} + T_{TOTmaxerror}).$$

In case only a subcomponent $T_{Ms,i}$ of the time of transmission $T_{TOT,i}$ was determined for the $i^{th}$ signal, the actual prediction error is compared with the maximum prediction error $T_{TOTmaxerror}$ according to the following equation:

$$\text{abs}(T_{Ms,i,pred} - T_{Ms,i}) < T_{TOTmaxerror}$$

If the respective equation is not true, the tracking of the $i^{th}$ signal is rejected, since it can be assumed that the tracking was not correct. The $i^{th}$ signal could be for example a strong signal of a wrong satellite which correlated better with the given code than a weak signal of the correct satellite.

If the respective equation is true, the tracking of the $i^{th}$ signal is not rejected. Before it is definitely accepted, however, an additional verification is carried out.

In the additional verification, the Doppler frequency range is checked for each satellite which was not rejected in the first verification.

The receiver measures to this end the frequency shift $f_{measurement,i}$ of the $i^{th}$ signal. Depending on the velocity of the respective satellite relative to the GPS receiver, the measured frequency will deviate from zero by a frequency shift $f_{measurement,i}$ due to the Doppler effect.

The available orbit parameters are used for determining for the satellite from which the $i^{th}$ signal is supposed to originate a range $(f_{Dmin}, f_{Dmax})$ within which the determined frequency shift $f_{measured,i}$ should lie in view of the satellite motion relative to the GPS receiver. For evaluating the available orbit parameters, the time of transmission $T_{CTOT}$ of the calibration signal can be used again as reference time.

The range should also take into account a maximum receiver velocity. The frequency will usually further be biased by the local clock inaccuracy. Since the receiver usually has an estimate $\Delta f_{clock}$ of this inaccuracy, the possible overall frequency shift can be estimated as $$(f_{min}, f_{max}) = (f_{Dmin} + f_{clock} - \Delta f_{clock}, f_{Dmax} + f_{clock} + \Delta f_{clock}).$$

The tracking of the $i^{th}$ signal is thus only validated in case the determined frequency shift $f_{measured,i}$ lies in addition in the range $(f_{min}, f_{max})$ determined for the satellite which transmitted the $i^{th}$ signal. Otherwise, the tracking of the $i^{th}$ signal is rejected as well.

When a tracking has been rejected or validated, the calibration loop is continued for the next tracked signal with $i=i+1$, until all N tracked signals other than the calibration signal are checked.

The correlation procedure and the described method can be repeated for those given codes for which the tracking was rejected.

It is to be noted that the described embodiment constitutes only one of a variety of possible embodiments of the invention.

The invention claimed is:

1. A method for validating detected code modulated signals transmitted by beacons of a positioning system and received by a receiver of said positioning system, which beacon signals are detected based on a correlation procedure performed between a respective given code for a specific beacon and received beacon signals, said method comprising:

performing measurements for said detected beacon signals;

selecting at least one of said detected beacon signals as a calibration signal;

determining at least one allowed range for results of measurements for detected beacon signals other than said calibration signal based on measurements for said detected calibration signal and on an available reference position of said receiver; and rejecting each detection of a beacon signal for which results of performed measurements are outside of an allowed range determined for said measurements.

2. A method according to claim 1, wherein at least the detected beacon signal with the strongest signal level is selected as calibration signal.

3. A method according to claim 1, wherein said ranges are determined based in addition on orbit parameters available for said beacons.

4. A method according to claim 1, wherein said measurements for which a range is determined comprise at least a measurement of the code phase of the detected beacon signals.

5. A method according to claim 4, wherein said code phase is determined based at least on an information on the time of transmission of a respective detected beacon signal, which information is comprised as data in said beacon signals.

6. A method according to claim 4, wherein said code phase is determined based at least on a sub component of the time of transmission of a respective detected beacon signal, which sub component is obtained by detecting regularities in said received beacon signals.

7. A method according to claim 4, wherein a range is determined for said code phase by predicting a code phase based on the code phase of said calibration signal, on an available reference position of said receiver and on available orbit parameters, and by adding and subtracting a possible error in said prediction.

8. A method according to claim 1, wherein said measurements for which a range is determined comprise a measurement indicating a frequency shift in received beacon signals due to the relative velocity between the respective beacon and said receiver.

9. A method according to claim 1, wherein said detected beacon signals are detected in a tracking process.

10. A receiver for use in a positioning system, comprising
receiving means for receiving and detecting code modulated signals transmitted by beacons of said positioning system; and
processing means for carrying out the method according to claim 1.

11. A receiver according to claim 10, which receiver is a GPS (Global Positioning system) receiver or a Galileo receiver.

12. An electronic device comprising a receiver according to claim 10.

13. An electronic device according to claim 12, wherein said electronic device is a mobile terminal capable of connecting to a network.

14. A device for use with a positioning system, comprising
means for receiving from a receiver information on code modulated signals transmitted by beacons of a positioning system and received and detected by said receiver; and
processing means for carrying out the method according to claim 1.

15. A device according to claim 14, which device is a network element of a network.

16. A positioning system for validating detected code modulated signals, comprising
a receiver comprising means for receiving code modulated signals transmitted by beacons, and means for providing information on received code modulated beacon signals; and
a device according to claim 14.

17. A positioning system for validating detected code modulated signals, comprising
a receiver according to claim 10; and
a device for providing assistance data to said receiver.

18. A positioning system according to claim 17, wherein said device is a network element of a network.

* * * * *